US00RE51056E

(19) United States
(12) Reissued Patent
Yamada

(10) Patent Number: US RE51,056 E
(45) **Date of Reissued Patent: *Oct. 6, 2026**

(54) INFORMATION PROCESSING APPARATUS

(71) Applicant: MAXELL, LTD., Kyoto (JP)

(72) Inventor: Masaaki Yamada, Yokohama (JP)

(73) Assignee: Maxell, Ltd., Kyoto (JP)

( * ) Notice: This patent is subject to a terminal disclaimer.

(21) Appl. No.: 18/235,290

(22) Filed: Aug. 17, 2023

Related U.S. Patent Documents

Reissue of:
(64) Patent No.: 8,654,093
Issued: Feb. 18, 2014
Appl. No.: 13/366,983
Filed: Feb. 6, 2012

U.S. Applications:
(63) Continuation of application No. 17/497,855, filed on Oct. 8, 2021, now Pat. No. Re. 49,669, which is an
(Continued)

(30) Foreign Application Priority Data

Feb. 9, 2011 (JP) ..... 2011-025576

(51) Int. Cl.
*G06F 3/041* (2006.01)
*G06F 1/16* (2006.01)
(Continued)

(52) U.S. Cl.
CPC ..... *G06F 1/1626* (2013.01); *G06F 3/0412* (2013.01); *G06F 3/04842* (2013.01);
(Continued)

(58) Field of Classification Search
CPC ..... G06F 3/041; G06F 21/31
See application file for complete search history.

(56) References Cited

U.S. PATENT DOCUMENTS 5,844,547 A 12/1998 Minakuchi et al.
6,181,328 B1 1/2001 Shieh et al.
(Continued)

FOREIGN PATENT DOCUMENTS

CN 1226691 A 11/2005
CN 1755604 A 4/2006
(Continued)

OTHER PUBLICATIONS

Notice of Allowance issued in U.S. Appl. No. 17/497,855, dated May 18, 2023.
(Continued)

*Primary Examiner* — Robert L Nasser
(74) *Attorney, Agent, or Firm* — Rimon P.C.

(57) ABSTRACT

An information processing apparatus includes a touch panel which displays pieces of identification information including letters, figures, and symbols and detects a contact of the panel with a finger of a user or other object. When the touch panel detects the contact of the panel, a detection unit specifies identification information of one or more of the multiple pieces of identification information displayed on the touch panel, indicated by a position at which the contact in question occurred. The detection unit also detects an area of part of the panel where the contact occurred. A storage unit stores reference identification information and a reference area range. A control unit performs particular processing upon matching of the detected identification information with the stored reference identification information and the area of the contact detected by the detection unit falling within the stored reference area range.

8 Claims, 17 Drawing Sheets

Related U.S. Application Data application for the reissue of Pat. No. 8,654,093, and a continuation of application No. 16/260,879, filed on Jan. 29, 2019, now Pat. No. Re. 48,830, which is an application for the reissue of Pat. No. 8,654,093.

(51) Int. Cl.

| | |
|---|---|
| ***G06F 3/04842*** | (2022.01) |
| ***G06F 3/0488*** | (2022.01) |
| ***G06F 21/31*** | (2013.01) |
| ***G09G 5/10*** | (2006.01) |

(52) U.S. Cl.

CPC ..... *G06F 3/0488* (2013.01); *G06F 21/31* (2013.01); *G06F 2221/2109* (2013.01); *G06F 2221/2117* (2013.01)

(56) References Cited

U.S. PATENT DOCUMENTS

| | | | |
|---|---|---|---|
| 6,360,004 | B1 | 3/2002 | Akizuki |
| 6,509,847 | B1 | 1/2003 | Anderson |
| 6,546,122 | B1 | 4/2003 | Russo |
| 6,795,569 | B1 | 9/2004 | Setlak |
| 6,937,226 | B2 | 8/2005 | Sakurai et al. |
| 6,950,539 | B2 | 9/2005 | Bjorn et al. |
| 6,954,862 | B2 | 10/2005 | Serpa |
| 6,970,584 | B2 | 11/2005 | O'Gorman et al. |
| 7,190,348 | B2 | 3/2007 | Kennedy et al. |
| 7,289,824 | B2 | 10/2007 | Jerbi et al. |
| 7,345,675 | B1 | 3/2008 | Minakuchi et al. |
| 7,444,163 | B2 | 10/2008 | Ban et al. |
| 7,593,000 | B1 | 9/2009 | Chin |
| 7,605,804 | B2 | 10/2009 | Wilson |
| 7,697,729 | B2 | 4/2010 | Howell et al. |
| 7,725,511 | B2 | 5/2010 | Kadi |
| 7,738,916 | B2 | 6/2010 | Fukuda |
| 7,777,732 | B2 | 8/2010 | Herz et al. |
| 7,877,707 | B2 | 1/2011 | Westerman et al. |
| 7,982,721 | B2 | 7/2011 | Hio |
| 8,023,700 | B2 | 9/2011 | Riionheimo |
| 8,051,468 | B2 | 11/2011 | Davis et al. |
| 8,059,872 | B2 | 11/2011 | Tazoe |
| 8,127,254 | B2 | 2/2012 | Lindberg et al. |
| 8,224,392 | B2 | 7/2012 | Kim et al. |
| 8,402,533 | B2 | 3/2013 | LeBeau et al. |
| 8,443,199 | B2 | 5/2013 | Kim et al. |
| 8,477,115 | B2 | 7/2013 | Rekimoto |
| 8,498,406 | B2 | 7/2013 | Ghassabian |
| 8,528,073 | B2 | 9/2013 | Tawara |
| 8,605,959 | B2 | 12/2013 | Kangas et al. |
| 8,633,909 | B2 | 1/2014 | Miyazawa et al. |
| 8,649,575 | B2 | 2/2014 | Nagar et al. |
| 8,654,093 | B2 | 2/2014 | Yamada |
| 8,683,582 | B2 | 3/2014 | Rogers |
| 8,745,490 | B2 | 6/2014 | Kim |
| 8,782,775 | B2 | 7/2014 | Fadell et al. |
| 8,836,645 | B2 | 9/2014 | Hoover |
| 8,860,689 | B2 | 10/2014 | Zimchoni |
| 8,878,791 | B2 | 11/2014 | Grover et al. |
| 8,904,479 | B1 | 12/2014 | Johansson et al. |
| 9,027,117 | B2 | 5/2015 | Wilairat |
| 9,032,337 | B2 | 5/2015 | Oh et al. |
| 9,092,125 | B2 | 7/2015 | Michaelis et al. |
| 9,223,948 | B2 | 12/2015 | Griffin et al. |
| 9,244,562 | B1 | 1/2016 | Rosenberg et al. |
| 9,304,602 | B2 | 4/2016 | Ghassabian |
| 9,626,099 | B2 | 4/2017 | Michaelis et al. |
| 2002/0163506 | A1 | 11/2002 | Matusis |
| 2002/0181747 | A1 | 12/2002 | Topping |
| 2003/0139192 | A1 | 7/2003 | Chmaytelli et al. |
| 2003/0152253 | A1 | 8/2003 | Wong |
| 2004/0085300 | A1 | 5/2004 | Matusis |
| 2004/0100362 | A1 | 5/2004 | Mohamed et al. |
| 2004/0252867 | A1 | 12/2004 | Lan et al. |
| 2005/0162407 | A1* | 7/2005 | Sakurai et al. ..... 345/173 |
| 2005/0169503 | A1 | 8/2005 | Howell et al. |
| 2005/0253814 | A1 | 11/2005 | Ghassabian |
| 2006/0026535 | A1 | 2/2006 | Hotelling et al. |
| 2006/0066589 | A1 | 3/2006 | Ozawa et al. |
| 2006/0075256 | A1 | 4/2006 | Hagiwara et al. |
| 2006/0284853 | A1 | 12/2006 | Shapiro |
| 2007/0014442 | A1 | 1/2007 | Yu |
| 2007/0097096 | A1 | 5/2007 | Rosenberg |
| 2007/0152976 | A1 | 7/2007 | Townsend et al. |
| 2007/0250786 | A1 | 10/2007 | Jeon et al. |
| 2008/0049987 | A1 | 2/2008 | Champagne et al. |
| 2008/0069412 | A1 | 3/2008 | Champagne et al. |
| 2008/0158170 | A1 | 7/2008 | Herz et al. |
| 2008/0267465 | A1 | 10/2008 | Matsuo et al. |
| 2009/0046065 | A1 | 2/2009 | Liu et al. |
| 2009/0083847 | A1 | 3/2009 | Fadell et al. |
| 2009/0095540 | A1 | 4/2009 | Zachut et al. |
| 2009/0160800 | A1 | 6/2009 | Liu et al. |
| 2009/0165145 | A1 | 6/2009 | Haapsaari et al. |
| 2009/0169070 | A1 | 7/2009 | Fadell |
| 2009/0313693 | A1 | 12/2009 | Rogers |
| 2010/0020020 | A1 | 1/2010 | Chen |
| 2010/0020035 | A1 | 1/2010 | Ryu et al. |
| 2010/0026642 | A1 | 2/2010 | Kim et al. |
| 2010/0044121 | A1 | 2/2010 | Simon et al. |
| 2010/0045608 | A1 | 2/2010 | Lessing |
| 2010/0060571 | A1 | 3/2010 | Chen et al. |
| 2010/0066701 | A1 | 3/2010 | Ningrat |
| 2010/0070931 | A1 | 3/2010 | Nichols |
| 2010/0079380 | A1 | 4/2010 | Nurmi |
| 2010/0097176 | A1 | 4/2010 | Sakurai et al. |
| 2010/0110228 | A1 | 5/2010 | Ozawa et al. |
| 2010/0138914 | A1 | 6/2010 | Davis et al. |
| 2010/0180336 | A1 | 7/2010 | Jones et al. |
| 2010/0225443 | A1 | 9/2010 | Bayram et al. |
| 2010/0231356 | A1 | 9/2010 | Kim |
| 2010/0265185 | A1 | 10/2010 | Oksanen |
| 2010/0279738 | A1 | 11/2010 | Kim et al. |
| 2010/0303311 | A1 | 12/2010 | Shin et al. |
| 2010/0325721 | A1 | 12/2010 | Bandyopadhyay et al. |
| 2011/0012856 | A1 | 1/2011 | Maxwell et al. |
| 2011/0074677 | A1 | 3/2011 | Ording et al. |
| 2011/0162420 | A1 | 7/2011 | Lee |
| 2011/0175804 | A1 | 7/2011 | Grover |
| 2011/0300829 | A1 | 12/2011 | Nurmi et al. |
| 2011/0310024 | A1 | 12/2011 | Sakatsume |
| 2011/0310049 | A1 | 12/2011 | Homma et al. |
| 2011/0321157 | A1 | 12/2011 | Davis et al. |
| 2012/0023573 | A1 | 1/2012 | Shu |
| 2012/0032979 | A1 | 2/2012 | Blow et al. |
| 2012/0044156 | A1 | 2/2012 | Michaelis et al. |
| 2012/0056846 | A1 | 3/2012 | Zaliva |
| 2012/0075098 | A1 | 3/2012 | Kuncl |
| 2012/0084734 | A1 | 4/2012 | Wilairat |
| 2012/0098639 | A1 | 4/2012 | Tjas et al. |
| 2012/0192100 | A1 | 7/2012 | Wang et al. |
| 2012/0196573 | A1 | 8/2012 | Sugiyama et al. |
| 2012/0200515 | A1 | 8/2012 | Yamada |
| 2012/0229406 | A1 | 9/2012 | Wu |
| 2012/0274662 | A1 | 11/2012 | Kim et al. |
| 2012/0284297 | A1 | 11/2012 | Aguera-Arcas et al. |
| 2012/0285297 | A1 | 11/2012 | Rozmus et al. |
| 2012/0299856 | A1 | 11/2012 | Hasui |
| 2012/0299860 | A1 | 11/2012 | Wang et al. |
| 2012/0319977 | A1 | 12/2012 | Kuge |
| 2016/0034177 | A1 | 2/2016 | Westerman et al. |

FOREIGN PATENT DOCUMENTS

| | | | |
|---|---|---|---|
| CN | 1912819 | A | 2/2007 |
| CN | 101930341 | A | 12/2010 |
| GB | 2393066 | A | 3/2004 |
| JP | 5-100809 | A | 4/1993 |
| JP | 5-1008089 | | 4/1993 |
| JP | H05100809 | A | 4/1993 |
| JP | H11-272423 | A | 10/1999 |
| JP | 2001-242952 | A | 9/2001 |
| JP | 2003-529130 | A | 9/2003 |

(56) References Cited

FOREIGN PATENT DOCUMENTS

| | | | |
|---|---|---|---|
| JP | 2005-202527 | | 7/2005 |
| JP | 2005-202527 | A | 7/2005 |
| JP | 2006-127486 | A | 5/2006 |
| JP | 2006-172180 | A | 6/2006 |
| JP | 2008-243149 | A | 10/2008 |
| JP | 2011-014044 | A | 1/2011 |
| KR | 100847140 | B1 | 7/2008 |
| KR | 100884045 | B1 | 2/2009 |
| KR | 10-2010-0003572 | A | 1/2010 |
| KR | 20100003572 | A | 1/2010 |
| TW | 201101130 | A1 | 1/2011 |
| WO | 2001/069520 | A2 | 9/2001 |
| WO | 2005/008568 | A1 | 1/2005 |
| WO | 2010/070756 | A1 | 6/2010 |
| WO | 2010/073243 | A1 | 7/2010 |
| WO | 2010/104015 | A1 | 9/2010 |
| WO | 2011/094936 | A1 | 8/2011 |

OTHER PUBLICATIONS

Non-Final Office Action issued in U.S. Appl. No. 17/497,855, dated Oct. 20, 2022.

Numabe et al., "Finger Identification for Touch Panel Operation Using Tapping Fluctuation," The 13th IEEE International Symposium on Consumer Electronics, pp. 899-902 (2009).

Eleccion, "Automatic Fingerprint Identification," IEEE Spectrum (1973).

Holz et al., "The Generalized Perceived Input Point Model and How to Double Touch Accuracy By Extracting Fingerprints," Proceedings of the SIGCHI Conference on Human Factors in Computing Systems (2010).

Wang et al., "Detecting and Leveraging Finger Orientation for Interaction With Direct-Touch Surfaces," Proceedings of the 22nd Annual ACM Symposium on User Interface Software and Technology (2009).

Saevanee et al., "User Authentication Using Combination of Behavioral Biometrics Over the Touchpad Acting Like Touch Screen of Mobile Device," International Conference on Computer and Electrical Engineering (2008).

Harrison et al., "TapSense: Enhancing Finger Interaction on Touch Surfaces," Proceedings of the 24th Annual ACM Symposium on User Interface Software and Technology (2011).

Sugiura & Koseki, A User Interface Usign Fingerprint Recognition—Holding Commands and Data Objects on Fingers, C&C Media Research Labs., NEC Corp. (1998).

Kaoru Uchida, Fingerprint-based User-friendly Interface and Pocket-PID for Mobile Authentication, IEEE 205 (2000).

Jansen et al., Picture Password: A Visual Login Technique for Mobile Devices, National Institute of Standards and Technology Interagency Report (2003).

Jansen et al., Fingerprint Identification and Mobile Handheld Devices: An Overview and Implementation, National Institute of Standards and Technology Interagency Report 7290, (Mar. 2006).

Benko et al., Precise Selection Techniques for Multi-Touch Screens, CHI 2006, Apr. 22-28, 2006.

Ricci et al., SecurePhone: A Mobile Phone with Biometric Authentication and E-Signature Support for Dealing Securet Transactions on the Fly, Proceedings of SPIE vol. 6250, Defense and Security Symposium (2006).

Forlines et al., Direct-Touch vs. Mouse Input for Tabletop Displays, Proceedings of CHI 2007, Apr. 28-May 3, 2007.

Cheng et al., SmartSiren: Virus Detection and Alert for Smartphones, MobiSys '07 (Jun. 11-14, 2007).

Fujitsu F906i comes with AuthenTec/TruNav: iPhone Competitor, Smart in Technology, (Aug. 2008).

Jansen & Scarfone, Guidelines on Cell Phone and PDA Security, National Institute of Standards and Technology Special Publication 800-124 (Oct. 2008).

Roudaut et al., MicroRolls: Expanding Touch-Screen Input Vocabulary by Distinguishing Rolls v. Slides of the Thumb, CHI 2009 (Apr. 4-9, 2009).

Yatani & Truong, SemFeel: A User Interface with Semantic Feedback for Mobile Touchscreen Devices, Department of Computer Science, University of Toronto, UIST '09, (Oct. 4, 2009).

Maltoni, Davide, et al., Handbook of Fingerprint Recognition (2nd ed.) Springer-Verlag London, Ltd. (2009), pp. 67, 74, 191, 244-45.

Benko et. al., Enhancing Input On and Above the Interactive Surface with Muscle Sensing,ITS '09 (Nov. 23-25, 2009).

Ahsamullah et al., Investigation of Fingertip Blobs on Optical Multi-Touch Screen, Dept. of Computer and Information Sciences, Universiti Teknologi Petronas (2010).

Park & Han, One-Handed Thumb Interaction of Mobile Devices From the Input Accuracy Perspective, 40 Intl. J. Industrial Ergonomics 746 (2010).

Respondents' Initial Invalidity Contentions (Initial Version), dated Dec. 7, 2022.

Respondents' Supplemental Invalidity Contentions, dated Jan. 17, 2023.

Entire Prosecution of U.S. Appl. No. 13/366,983, filed Feb. 6, 2012, now U.S. Pat. No. 8,654,093, issued Feb. 18, 2014 to Yamada entitled "Information Processing Apparatus".

Entire Prosecution of U.S. Appl. No. 14/154,993, filed Jan. 14, 2014, now U.S. Pat. No. 8,982,086, issued Mar. 17, 2015 to Yamada entitled "Information Processing Apparatus".

Chinese Office Action issued in corresponding Chinese Patent Application No. 2014062700460410, dated Jul. 2, 2014.

Yau, et al., "Nonlinear phase portrait modeling of fingerprint orientation", 2004 8th International Conference on Control, Automation, Robotics and Vision Kunming, China; SAM-MAX-00172295, Dec. 6, 2004.

Yatani & Truong, "SemFeel: A user Interface with Semantic Tactile Feedback for Mobile Touch-screen Devices", UIST; SAM-MAX-00172285, Oct. 4, 2009.

Wang & Ren, "Empirical Evaluation for Finger Input Properties in Multi-Touch Interaction", CHI 2009 Tabletop Gestures; SAM-MAX-00172275, Apr. 7, 2009.

Wang, et al., "Detecting and Leveraging Finger Orientation for Interaction with Direct-Touch Surfaces", UIST; SAM-MAX-00172265, Oct. 4, 2009.

Tan, et al., "Spy-resistant keyboard: more secure password entry on public touch screen displays", Microsoft Research; SAM-MAX-00171926, Jan. 2005.

Monrose & Rubin, "Keystroke dynamics as a biometric for authentication", Future Generation Computer Systems 16 (2000); SAM-MAX-00171875, Mar. 3, 1999.

Park & Han, "One-handed thumb interaction of mobile devices from the input accuracy perspective", International Journal of Industrial Ergonomics 40; SAM-MAX-00171884, Sep. 16, 2010.

Manabe & Fukumoto, "Proposal of New Input Systems" Technology Reports, Journal vol. 9 No. 4; SAM-MAX-00171869, Mar. 3, 2008.

Ricci, et al., "SecurePhone: a mobile phone with biometric authentication and e-signature support for dealing secure transactions on the fly"; SPIE, vol. 6250, SAM-MAX-00171895, May 2, 2006.

Maltoni, et al., "Fingerprint classification and indexing", Handbook of Fingerprint Recognition (2nd ed.), SAM-MAX-00171831, 2009.

Sugiura & Koseki, "A User Interface Using Fingerprint Recognition—Holding Commands and Data Objects on Fingers", C&C Media Research Laboratories; SAM-MAX-00171917, 1998.

Roudaut, et al., "MicroRolls: Expanding Touch-Screen Input Vocabulary by Distinguishing Rolls vs. Slides of the Thumb"; SAM-MAX-00171907, Apr. 4, 2009.

Benko, et al., "Enhancing Input On and Above the Interactive Surface with Muscle Sensing", ITS; SAM-MAX-00171508, Nov. 23, 2009.

Fujitsu "F906i comes with AuthenTec/TrueNav: iPhone competitor", Smart in Technology Blog; SAM-MAX-00171732, Aug. 2008.

Forlines, et al., "Direct-Touch vs. Mouse Input for Tabletop Displays", Mitsubishi Electric Research Laboratories; SAM-MAX-00171720, Apr. 2007.

(56) References Cited

OTHER PUBLICATIONS

Jansen & Scarfone, "Guidelines on Cell Phone and PDA Security", NIST Special Publication 800-124; SAM-MAX-00171735, Oct. 2008.
Holz & Baudisch, "The Generalized Perceived Input Point Model and How to Double Touch Accuracy by Extracting Fingerprints", CHI 2010: Speech and Touch; SAM-MAX-00171786, Apr. 10, 2010.
Diefenderfer, Naval Post Graduate School Thesis—"Fingerprint Recognition"; SAM-MAX-00171567, Jun. 2006.
Jansen, et al., "Fingerprint Identification and Mobile Handheld Devices: An Overview and Implementation", NISTIR 7290; SAM-MAX-00172301, Mar. 2006.
Jansen, et al., "Picture Password: A Visual Login Technique for Mobile Devices", NISTIR 7030; SAM-MAX-00171796, Jul. 2003.
Chan, et al., "Fast Fingerprint Verification Using Subregions of Fingerprint Images", IEEE Transactions on Circuits and Systems for Video Technology, vol. 14, No. 1; SAM-MAX-00171546, Jan. 2004.
Uchida, "Fingerprint-based User-friendly Interface and Pocket-PID for Mobile Authentication", Computer and Communication Media Research, NEC Corporation; SAM-MAX-00171816, 2000.
Cheng, et al., "SmartSiren: Virus Detection and Alert for Smartphones", Mobisys; SAM-MAX-00171553, Jun. 11, 2007.
Blasko, IBM Research Report: "A Wristwatch-Computer Based Password-Vault", RC23616 (W0503-066); SAM-MAX-00171527, Mar. 10, 2005.
Benko, "Precise Selection Techniques for Multitouch Screens", CHI 2006; SAM-MAX-00171516, Apr. 22, 2006.
Areekul, et al., "The New Focal Point Localization Algorithm for Fingerprint Registration", IEEE; SAM-MAX-00171504, 2006.
Ahsanullah, et al., "Investigation of Fingertip Blobs on Optical Multi-touch Screen", IEEE; SAM-MAX-00171497, 2010.
Merriam-webster dictionary definition of coincident from Feb. 20, 2010.
Non-Final Office Action issued in U.S. Appl. No. 16/260,879, dated Jan. 22, 2020.
Final Office Action issued in U.S. Appl. No. 16/260,879, dated Aug. 5, 2020.
Notice of Allowance issued in U.S. Appl. No. 16/260,879, dated Nov. 23, 2020.
Notice of Allowance issued in U.S. Appl. No. 16/260,879, dated Jul. 8, 2021.
Manabe et al, "Proposal of New Imput Systems," NTT Technology Reports, Technical Journal, vol. 9, No. 4, Mar. 2008, pp. 37-42.
Monrose Fabian et al., "Keystroke dynamics as a biometric for authentication," Elsevier Science, Future Generation Computer Systems vol. 16, 2000, pp. 351-359.
Tan, Desney S. et al, "Spy-Resistant Keyboard: More Secure Password Entry on Public Touch Screen Displays," Microsoft Research, Jan. 2005, 10 pages.
APC Biopod Quick Installation Guide, Part No. 990-1705, APC, www.apc.com, 2 pages, 2003.
Diefenderfer, Graig T., "Fingerprint Recognition," Thesis, Naval Postgraduate School, Jun. 2006, 153 pages.
Blasko, Gabor et al., "A Wristwatch-Computer Based Password-Vault," IBM Research Report, Computer Science, Mar. 2005, 19 pages.
Chan, K.C., et al., "Fast Fingerprint Verification Using Subregions of Fingerprint Images," IEEE Transactions on Circuits and Systems for Video Technology, vol. 14, No. 1, Jan. 2004, pp. 95-101.
Yau, Wei-Yun et al., "Nonlinear phase portrait modeing of fingerprint orientation," 8th International Conference on Control, Automation, Robotics and Vision China, Dec. 2004, pp. 1262-1267.
Akreekul, Vutipong, et al., "The New Focal Point Localization Algorithm for Fingerpring Recognition," IEEE Computer Society, The 18th International Conference on Pattern Recognition (ICPR'06), 2006, 4 pages.
Wang, Feng, et al., "Empirical Evaluation for Finger Input Properties In Mutli-touch linteraction," CHI, Tabletop Gestures, Apr. 2009, pp. 1062-1072.

* cited by examiner

FIG. 12A

| DIGIT | 1 | 2 | 3 | 4 |
|---|---|---|---|---|
| PASSWORD | 0 | 5 | 2 | 8 |
| INPUT METHOD | FINGER TIP | FINGER PAD | FINGER PAD | FINGER PAD |

FIG. 12B

| DIGIT | | 1 | 2 | 3 | 4 | OPERATION |
|---|---|---|---|---|---|---|
| PASSWORD | | 0 | 5 | 2 | 8 | — |
| INPUT METHOD | 1 | FINGER TIP | FINGER PAD | FINGER PAD | FINGER PAD | WAITING SCREEN |
| | 2 | FINGER TIP | FINGER TIP | FINGER TIP | FINGER TIP | MAIL CREATING SCREEN |
| | 3 | FINGER PAD | FINGER TIP | FINGER PAD | FINGER TIP | APPLICATION STARTING |

INFORMATION PROCESSING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIMS OF PRIORITY

*More than one reissue application has been filed for the reissue of Pat. No. 8,654,093. The reissue applications, in addition to the present application, are application Ser. Nos. 17/497,855 and 16/260,879, all of which are continuation reissues of U.S. Pat. No. 8,654,093.*

The present application *is a reissue application of U.S. Pat. No. 8,654,093 issued on Feb. 18, 2014 from U.S. patent application Ser. No. 13/366,983 filed Feb. 6, 2012, and is a continuation application of U.S. patent application Ser. No. 17/497,855 filed Oct. 8, 2021, which is a continuation application of U.S. patent application Ser. No. 16/260,879 filed Jan. 29, 2019, now U.S. Pat. No. RE48,830, which is also a reissue application of U.S. Pat. No. 8,654,093 issued on Feb. 18, 2014 from U.S. patent application Ser. No. 13/366,983 filed Feb. 6, 2012, which in turn* claims priority from Japanese patent application serial [no.] *No.* JP2011-025576, filed on [Feb.] *Feb.* 9, 2011, the [content] *entire contents* of *each of* which [is] *are* hereby incorporated by reference into this application.

BACKGROUND OF THE INVENTION

The present invention relates to information processing apparatuses.

JP-A-05-100809 discloses art related to the technical field of the present invention. The publication describes "An information processing apparatus including a touch panel device at least comprising: a physical type of an object; display position information on a display; file information where a status of the object is set; a display information table 1 storing display data of the object that includes a name of a file in a normal state and a name of the file in a special state (reversed display); and touch panel information 2 including a touch position coordinate and touch pressure information. A physical operation decided by a corresponding relation between physical information indicated by the display information table 1 and physical information indicated by the touch panel information 2 is given to the object to display it."

Recently, information processing apparatuses for portable usage have become multi-functioned and ease of use thereof is particularly required.

An object of the present invention is to provide an information processing apparatus that offers improved convenience to users.

SUMMARY OF THE INVENTION

To solve the foregoing problem, an aspect of the present invention provides an information processing apparatus comprising: a touch panel which displays a plurality of pieces of identification information including letters, figures, and symbols, and for detecting a contact of the panel with a finger of a user or other objects; a detection unit, when the touch panel detects a contact of the panel with the object, which species identification information indicated by a position of the contact at which the contact in question occurred, of the multiple pieces of identification information displayed on the touch panel, and which detects an area of part where the contact occurred; a storage unit which stores reference identification information and a reference area range; a determination unit which determines whether the identification information detected by the detection unit matches the reference identification information stored in the storage unit and whether the area of the contact detected by the detection unit falls within the reference area range stored in the storage unit; and a control unit which performs particular processing when the determination unit determines that the identification information detected by the detection unit matches the reference identification information stored in the storage unit and the area of the contact detected by the detecting unit falls within the reference area range stored in the storing unit.

By employing such system, an information processing apparatus including a touch panel can be improved in usability.

BRIEF DESCRIPTION OF DRAWINGS

The present invention will be described hereinafter with reference to the accompanying drawings.

FIG. 12A is a table showing data composed of a password and a corresponding input method.

FIG. 12B is a table showing data composed of one password and a plurality of corresponding input methods.

DESCRIPTION OF THE PREFERRED EMBODIMENTS

[First Embodiment]

Preferred embodiments of the present invention will be described below with reference to the accompanying drawings.

Figure 1A:
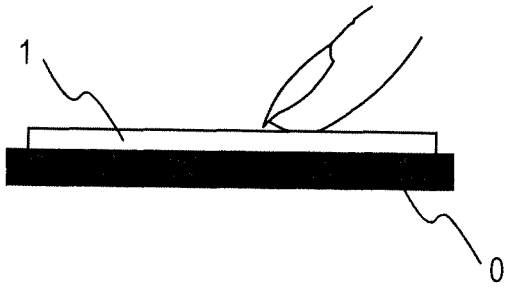
FIG. 1A is a schematic illustration of a user touching a touch panel 1 with a finger tip to make an input.
Figure 1B:
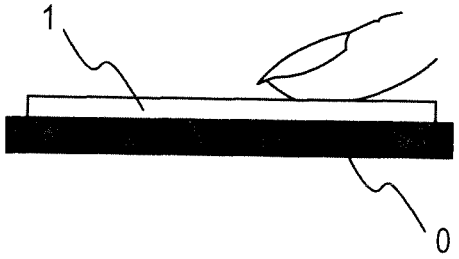
FIG. 1B is a schematic illustration of a user touching the touch panel 1 with a finger pad to make an input.

FIGS. 1A and 1B are illustrations showing methods by which a user makes a desired input in a portable terminal 0 according to a first preferred embodiment of the present invention. The portable terminal 0 shown in FIGS. 1A and 1B includes a touch panel 1 having a touch sensor function. FIG. 1A is an image of a user making input by touching the touch panel 1 with his or her finger tip. The input using one's finger tip is characterized in that an area of contact (hereinafter referred also to as a "contact range") between the finger of the user and the touch panel 1 is small. This operation by the user will hereinafter be referred to as a finger tip input. FIG. 1B schematically shows an image of a user making input by touching the touch panel 1 with his or her finger pad. The input using one's finger pad is characterized in that the contact range of the finger and the touch panel 1 is wider than that of the finger tip input. This operation by the user will hereinafter be referred to as a finger pad input.

Figure 2:
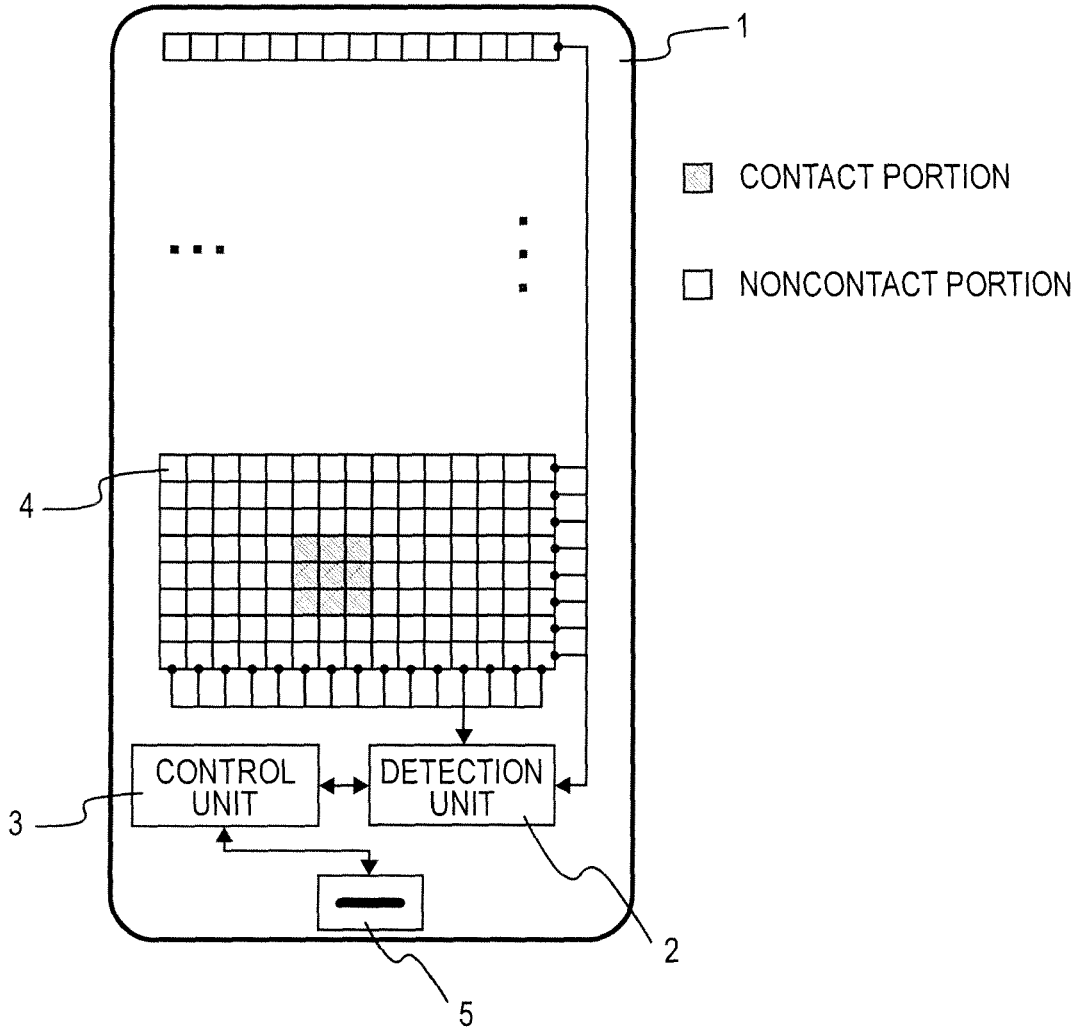
FIG. 2 is an illustration showing an example of the internal configuration of a portable terminal 0 including the touch panel 1.

FIG. 2 is an illustration showing a typical internal arrangement of the portable terminal 0. Reference numeral 1 denotes a touch panel that includes a group of sensors or a sensor 4, a liquid crystal panel, and a glass panel. When the user's finger contacts with the touch panel, capacitance of the sensor 4 changes and the sensor 4 outputs a signal according to the change. The liquid crystal panel displays numerals, letters, and the like. The glass panel is for protecting the sensor 4, etc. Reference numeral 2 denotes a contact range detection unit that detects the position and the contact range of a contact based on the signal output from the sensor 4. Reference numeral 3 denotes a control unit for controlling elements of the touch panel 1. The control unit 3 includes an arithmetic section, a counter, a determination unit which determines condition in accordance with input information into the control unit 3, and a storage unit which stores various types of data. Reference numeral 4 denotes, as mentioned, a group of sensors or a sensor whose capacitance varies upon contact with the user's finger. Portions shaded with diagonal lines represent sensors 4 that are responding to the contact with the finger. The blank portions represent sensors 4 that are not contacting with the finger and not responding. Reference numeral 5 denotes a button switch which the user pushes for various operations such as standby release or returning, advancing.

Figure 3:
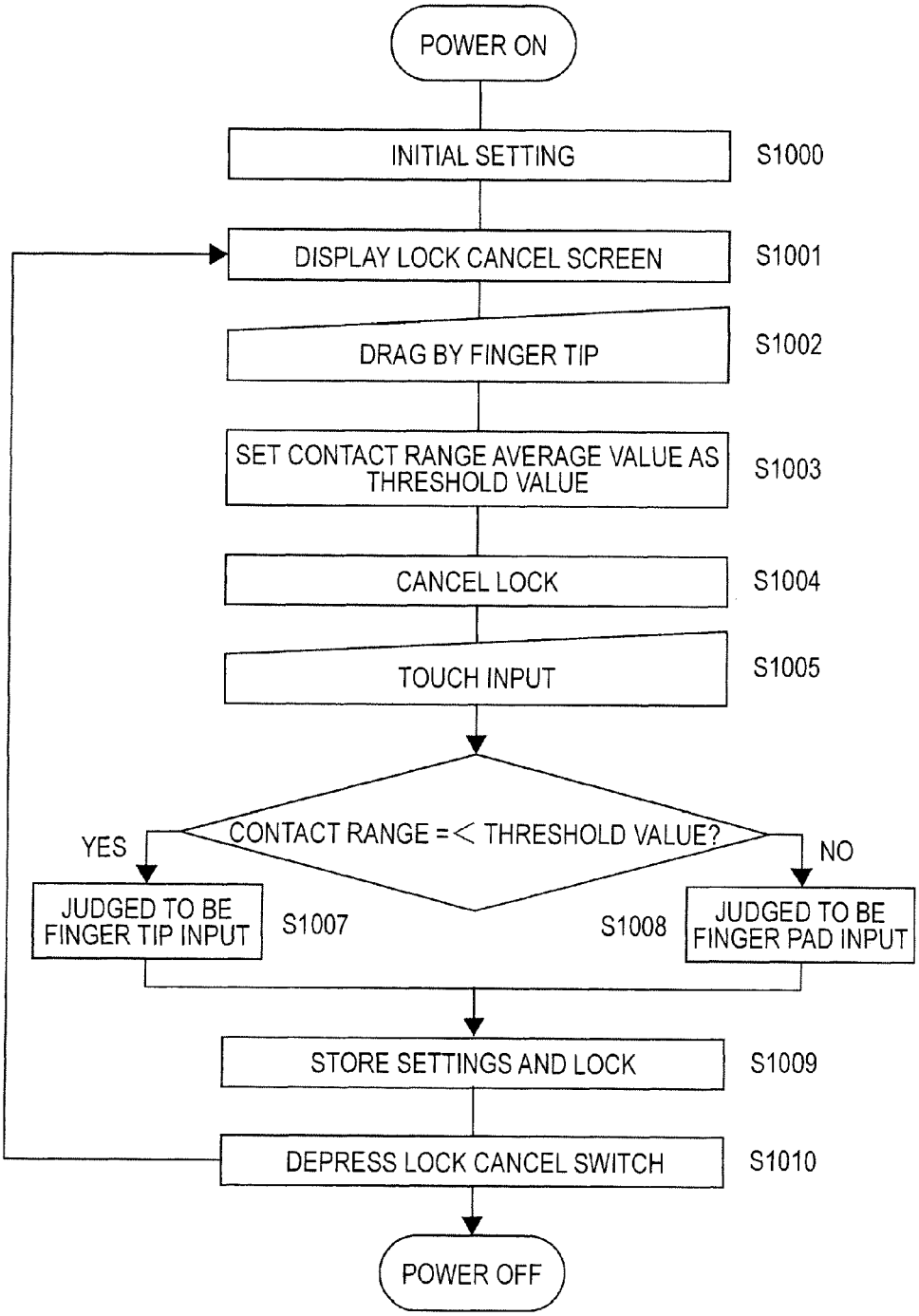
FIG. 3 is a flow chart showing a lock cancellation process of the portable terminal 0.
Figure 4B:
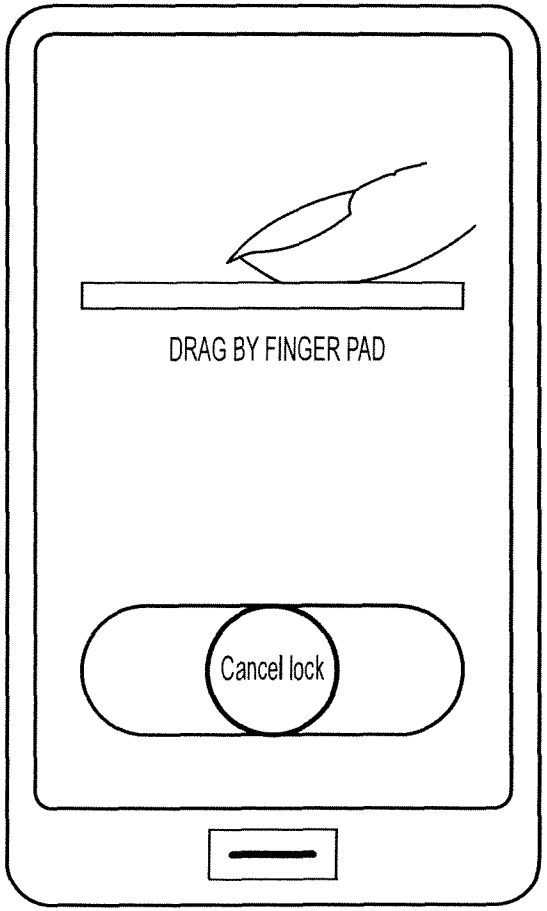
FIG. 4B is an illustration showing a typical screen image displayed during when the portable terminal 0 is to be unlocked by dragging with a finger pad.
Figure 4A:
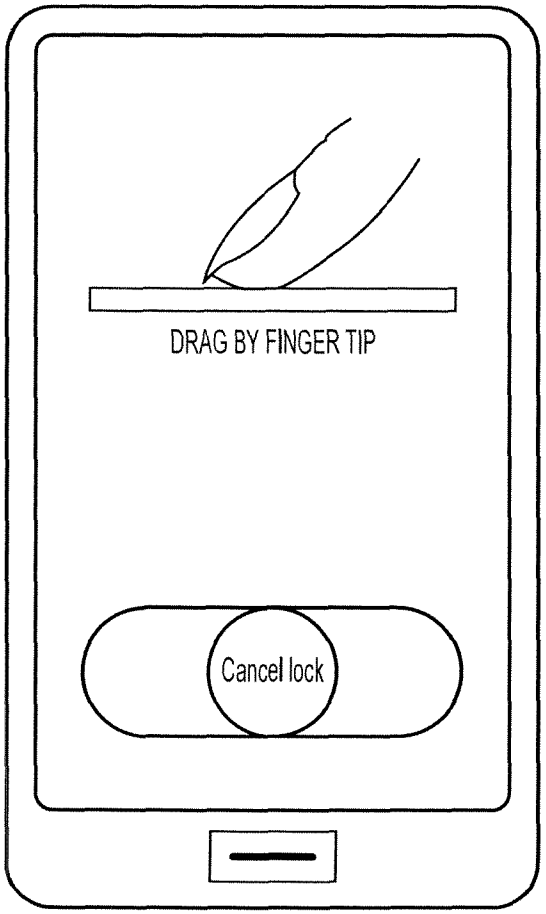
FIG. 4A is an illustration showing a typical screen image displayed during when the portable terminal 0 is to be unlocked by dragging with a finger tip.
Figures 5A, 5B:
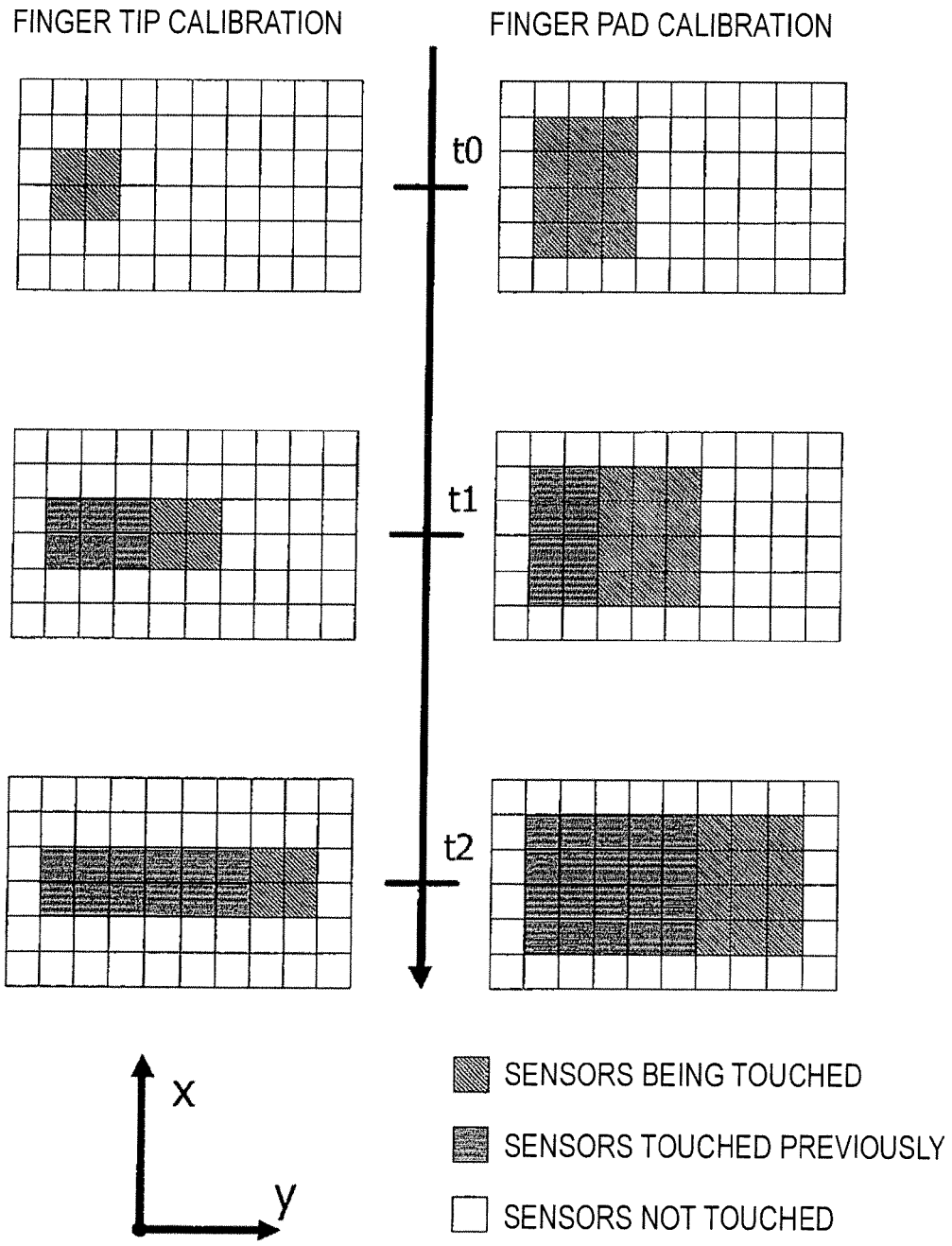
FIGS. 5A and 5B are illustrations showing schematically states of sensors 4 at various timing during lock cancellation.

The way of calibration and the usage method for cancelling the lock or unlocking the portable terminal 0 according to the first embodiment will be described below with reference to FIG. 3 showing a flow chart, FIGS. 4A and 4B showing lock cancellation display screens, and FIGS. 5A and 5B showing states of the sensor 4 at various timing during lock cancellation.

Among types of operation performed by the user on the portable terminal 0 are tapping, dragging, flicking, and pinching. Tapping is an operation which the user touches one point of the screen with a finger for a moment on the touch panel 1. Dragging is an operation which the user moves his or her finger over the screen of the touch panel 1 while the finger is in contact therewith. Flicking is an operation which the user quickly slides his or her finger on the screen of the touch panel 1 while touching it. Pinching is an operation which the user touches two points of the screen of the touch panel 1 with two fingers and changes the distance between the two points.

A series of operations from start-up of the portable terminal 0, calibration, and to turn-off of the portable terminal 0 will be next described. The term calibration used herein refers to an operation of setting a threshold value that is used for determining a contact range.

The power of the portable terminal turns on by pressing the button switch for a certain time. Then, the control unit 3 starts a program, adjusts the sensors, initializes the threshold value, and performs initial settings for screen display and other factors (S1000). After the initial setting procedure, the control unit 3 performs control to display lock cancel screen on the touch panel 1 (S1001). As can be seen in FIG. 4A, a lock cancel icon is present in the lock cancel screen which can be dragged in a y direction and a –y direction with a finger tip. The control unit 3 holds until the user drags the lock cancel icon with a finger tip (S1002).

FIG. 5A is a schematic view showing states of the sensor 4 at various timing during when the user drags the icon with a finger tip in the y direction for unlocking. In FIG. 5A, portions shaded with diagonal lines denote sensors 4 that are responding to the contact with a user's finger and portions shaded with horizontal lines denote sensors 4 that have responded in previous. The blank portions denote sensors 4 that have not been contacted and have not responded. The icon is first touched at time t0, and is dragged at time t1, and the dragging ends at time t2 to thus cancel the lock. The control unit 3 calculates the average value '2' of the number of columns of sensors 4 that responded to the contact with the finger and adds a correction value '1' to the average, thereby defining a threshold value '3'. The threshold value is stored in the control unit 3.

FIG. 4B shows another method for unlocking the terminal using the finger pad input. As can been seen in FIG. 4B, a lock cancel icon is displayed in the lock cancel screen that can be dragged in a y direction and a –y direction with a finger pad. FIG. 5B is a schematic view showing states of the sensor 4 at various timing during when the user drags the icon for cancelling the lock with a finger pad in the y direction for unlocking. The icon is first touched at time t0, then dragged at time t1, and the dragging ends at time t2 to thus cancel the lock. The control unit 3 calculates the average value '4' of the number of columns of sensors 4 that responded to the contact with the finger and subtracts a correction value '1' therefrom, thereby defining a threshold value '3'. The threshold value is stored in the control unit 3.

The threshold value used for determining the contact range is defined as above by using the average value of the number of columns of sensors 4 that responded to the contact with the finger during unlocking (S1003). In other words, the threshold value for determining the contact range can be obtained (i.e., calibration can be made), simultaneously with unlocking operation.

The control unit 3 unlocks the portable terminal 0 (S1004) and waits until the user makes various inputs by way of the touch panel 1 (S1005). Receiving an input with a contact range equal to or narrower than the threshold value (specifically, "3" or less) (S1006), the control unit 3 determines that a finger tip input is made (S1007). Receiving an input with a contact range wider than the threshold value (specifically, "4" or more) (S1006), the control unit 3 determines that a finger pad input is made (S1008). After that, various operations are performed following the order of the input.

When no input is made for a predetermined period, several minutes for example, the control unit 3 stores the time and date of calibration, the threshold value, and other setting values, and then locks the portable terminal 0 (S1009). The control unit 3 displays the lock cancel screen (S1001) when a lock cancel switch assigned to the button switch 5 is pushed (S1010). When the button switch 5 is pressed for a certain time while the power of the portable terminal 0 is on, the power turns off.

As described heretofore, regardless of difference with individuals in contact ranges of finger tip input, the calibration allows accuracy of contact range determination to be improved. The first embodiment of the present invention uses the average of the number of columns of the sensors 4 that responded to the contact with the finger as the threshold value. However, this is not the only possible way for setting the threshold. For example, the threshold value may be corrected by adding an appropriate value to, or subtracting any value from, the average of the number of columns of the sensors 4 that responded to a contact with a finger. The threshold value does not need to be an integer and instead a capacitance value may be used. Further, the threshold value used for determining the contact range may be discarded upon locking, and calibration can be performed to update threshold value every time the terminal is unlocked. Instead of performing calibration upon unlocking, calibration may be performed only at the first time the portable terminal 0 is turned on. It may also be performed by selecting a function for calibration from a setting menu or the like. Furthermore, the first embodiment of the present invention performed calibration on the basis of the contact range of either the finger tip input or the finger pad input. Alternatively, the contact ranges of both the finger tip input and the finger pad input may be obtained to set a plurality of threshold values.

Figures 6A, 6B:
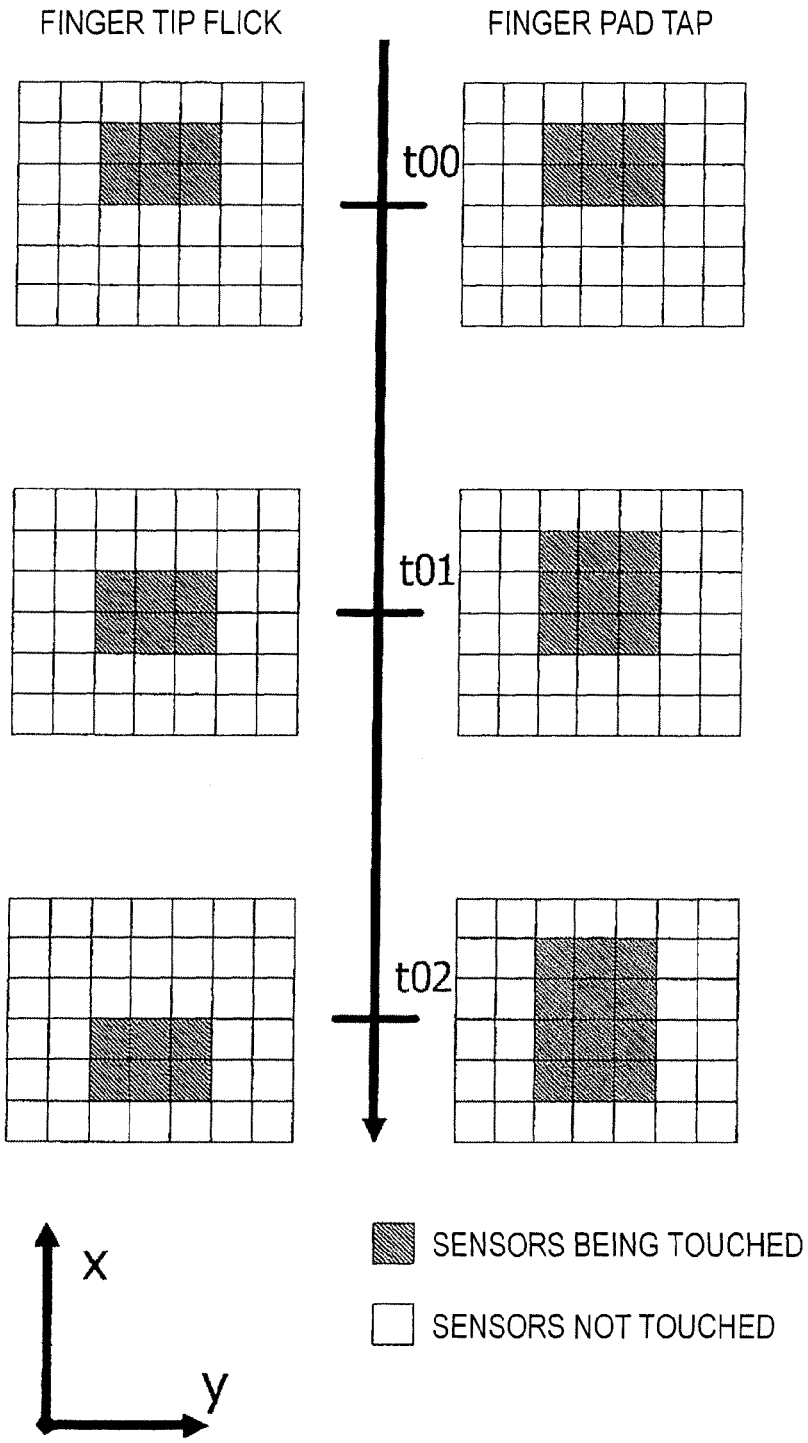
FIGS. 6A and 6B are illustrations showing a method for distinguishing between a finger tip flicking and a finger pad tapping.

A method for distinguishing the finger tip input and the finger pad input will be described in more details below. FIGS. 6A and 6B show a method for distinguishing flicking by finger tip input and tapping by finger pad input. FIG. 6A shows conditions of sensors 4 responding to a finger tip flicking in a −x direction. FIG. 6B shows conditions of sensors 4 responding to a finger pad tapping. At time t00 which is the time a contact starts, the number of sensors responding to the contact is same in FIGS. 6A and 6B. The control unit 3 stores the time t00 at which the contact is started. If the number of sensors responding to the contact range would not change at the subsequent time t01 and time t02, the control unit 3 determines the contact as a finger tip flicking. If the number of sensors responding increases as time elapses as the time t01 and the time t02, the control unit 3 determines the contact as a finger pad tapping. In brief, the control unit 3 distinguishes the finger tip flicking and the finger pad tapping by comparing the number of sensors that responded at the time t00 to the number of sensors responding at the time t02. Since the determination is not done at the instance of a user touching the touch panel 1, a finger pad input will not be misdetected as a finger tip input even when the initial contact range is narrow.

Figure 7B:
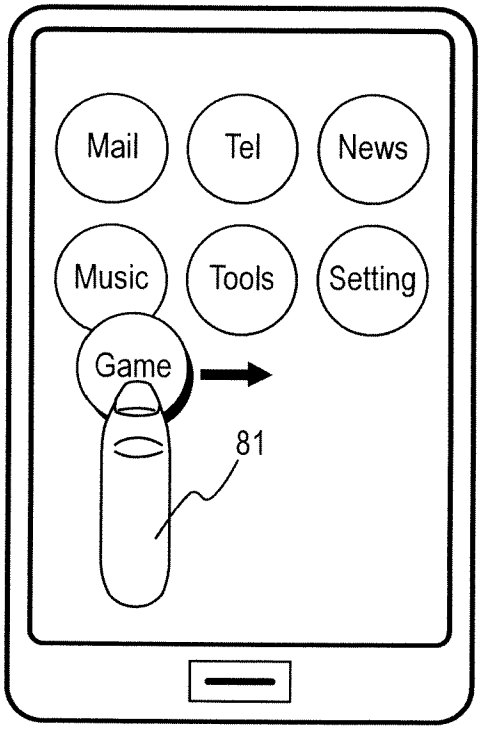
FIG. 7B is an illustration showing one state during the icon being moved; the state when the icon is being moved.
Figure 7A:
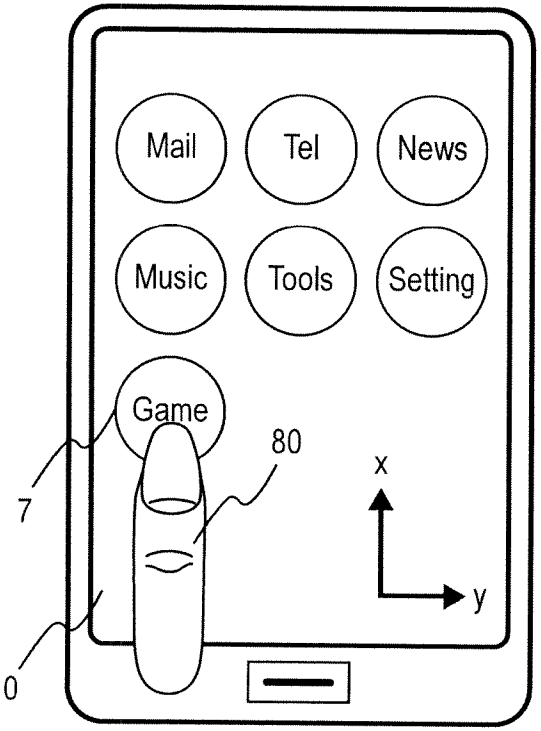
FIG. 7A is an illustration showing one state during an icon being moved; the state before the move has started.
Figure 7C:
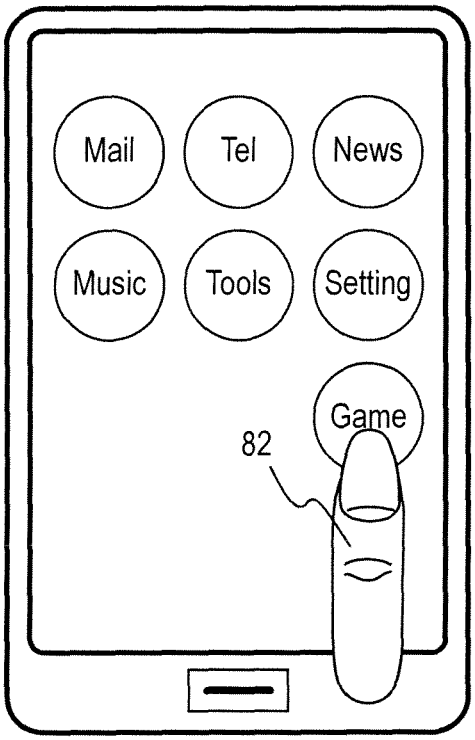
FIG. 7C is an illustration showing one state during the icon being moved; the state after the move has finished.
Figure 8:
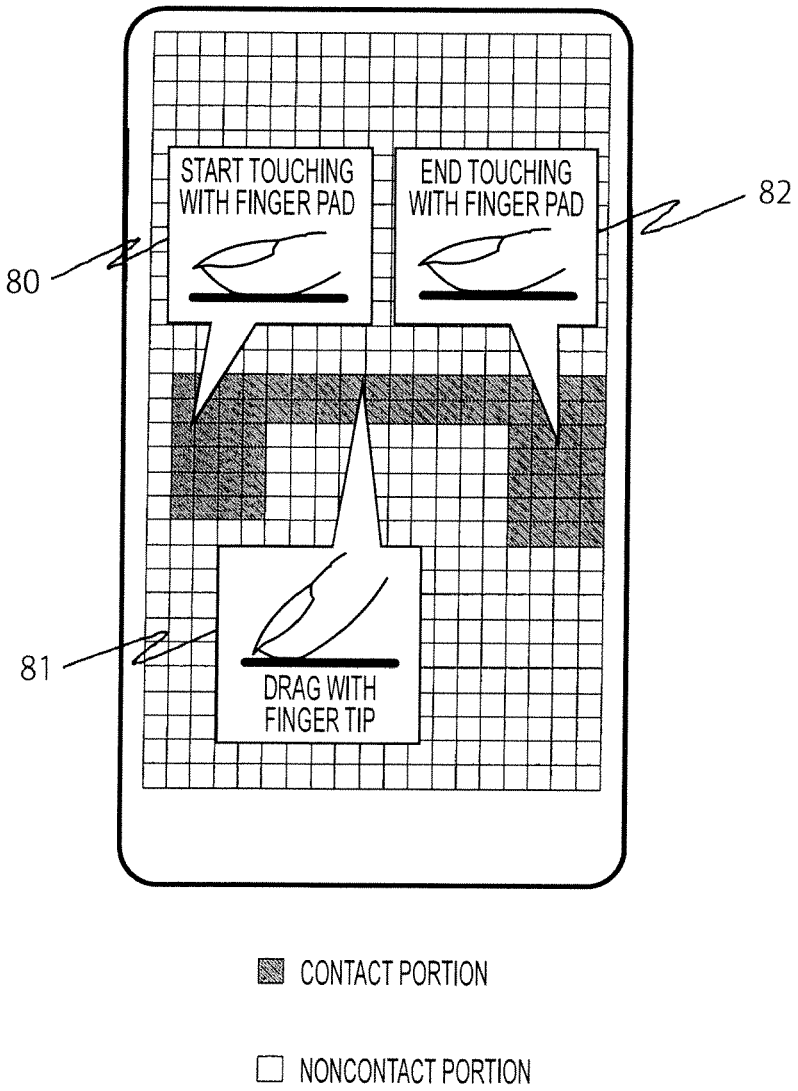
FIG. 8 is an illustration showing schematically the sensors 4 when the icon is moved.

A way of moving an icon utilizing the difference between contact ranges of the finger tip input and the finger pad input will be described in detail below. FIGS. 7A to 7C show states of an icon 7 moved rightwardly (in a y direction) by the user using finger tip input and finger pad input. FIG. 8 is a schematic view showing the sensors 4 that responded during the icon movement and the manner of finger movement. Reference numerals 80 and 82 represent fingers making finger pad input with a wide contact range and reference numeral 81 represents a finger making finger tip input with a narrow contact range. First, a user touches the icon 7 desired to be moved with the finger pad input 80. When the contact range is equivalent to or larger than the threshold value, the control unit 3 determines that the input is the finger pad input 80 and sets the icon 7 as a moving object (FIG. 7A). The user then shifts from the finger pad input 80 to the finger tip input 81 while keeping his or her finger in contact with the panel. As the contact range becomes equal to or less than the threshold value, the control unit 3 renders the icon 7 as the moving object movable (FIG. 7B). The user drags the icon 7 to a desired position and then shifts from the finger tip input 81 to the finger pad input 82. As the contact range becomes equivalent to or larger than the threshold value, the control unit 3 determines that the input is the finger pad input 82 and validates the position of the icon 7 (FIG. 7C).

As described above, the first embodiment allows the user to make more intuitive input. The contact range described herein may be the number of sensors responded or the maximum number of the columns of sensors responded. When an application for finger pad input with a wide contact area is not set or applied to the terminal, the process of determining contact area can be omitted and contact operation may be performed uniformly.

[Second Embodiment]

Figure 9:
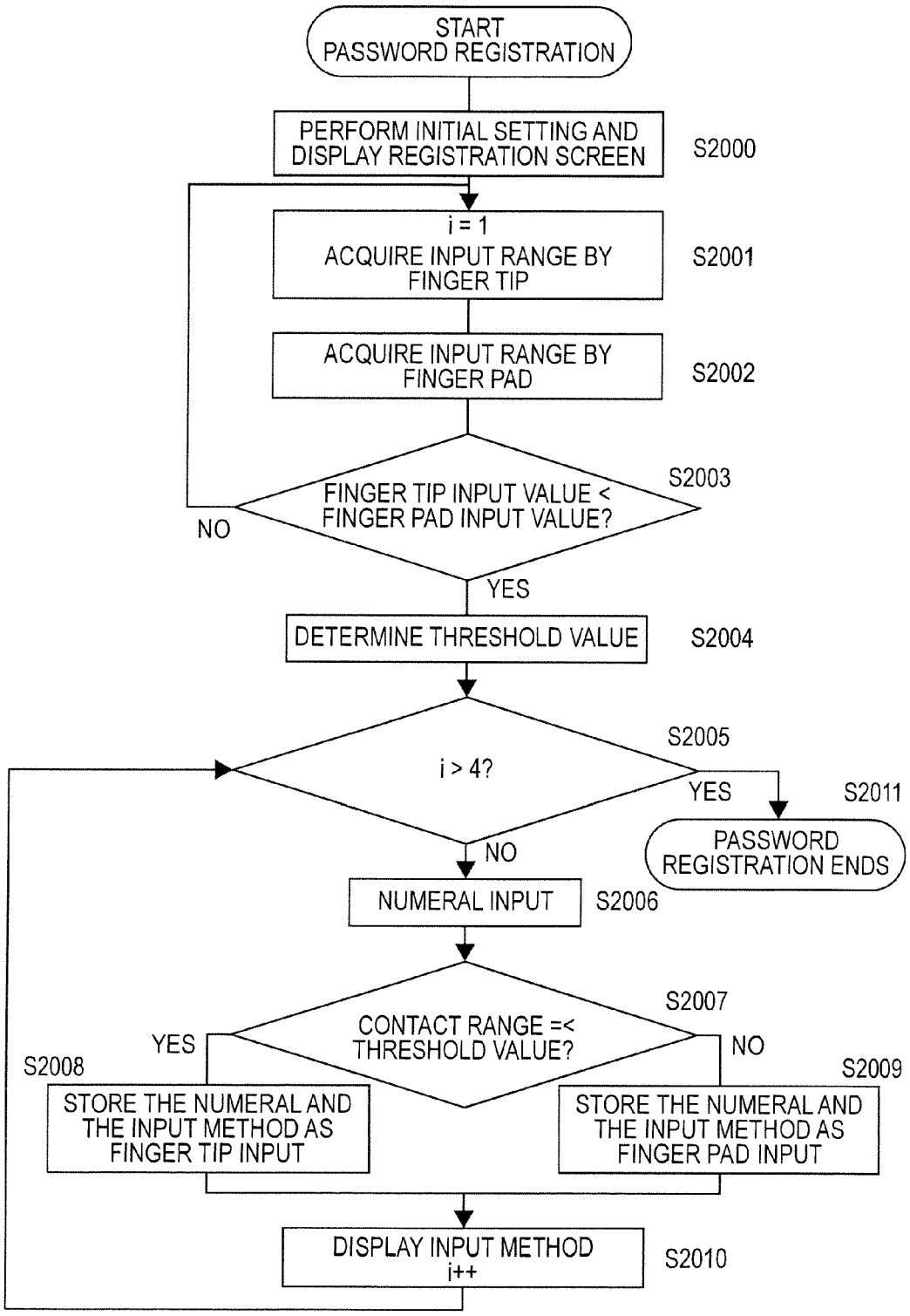
FIG. 9 is a flow chart for password registration.
Figure 10B:
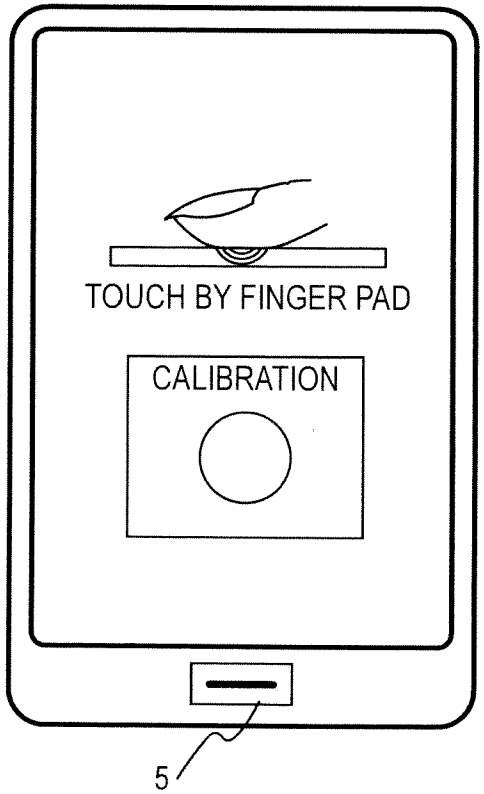
FIG. 10B is an illustration showing a typical screen image displayed during calibration to prompt the user to make a finger pad contact.
Figure 10A:
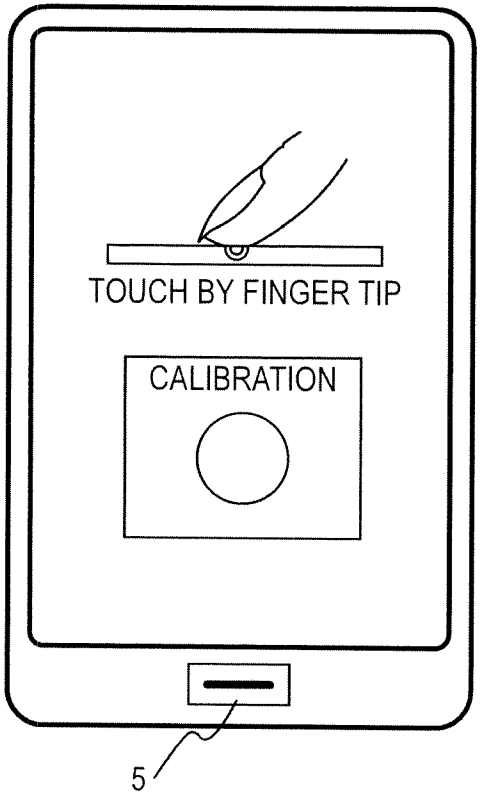
FIG. 10A is an illustration showing a typical screen image displayed during calibration to prompt the user to make a finger tip contact.
Figure 11A:
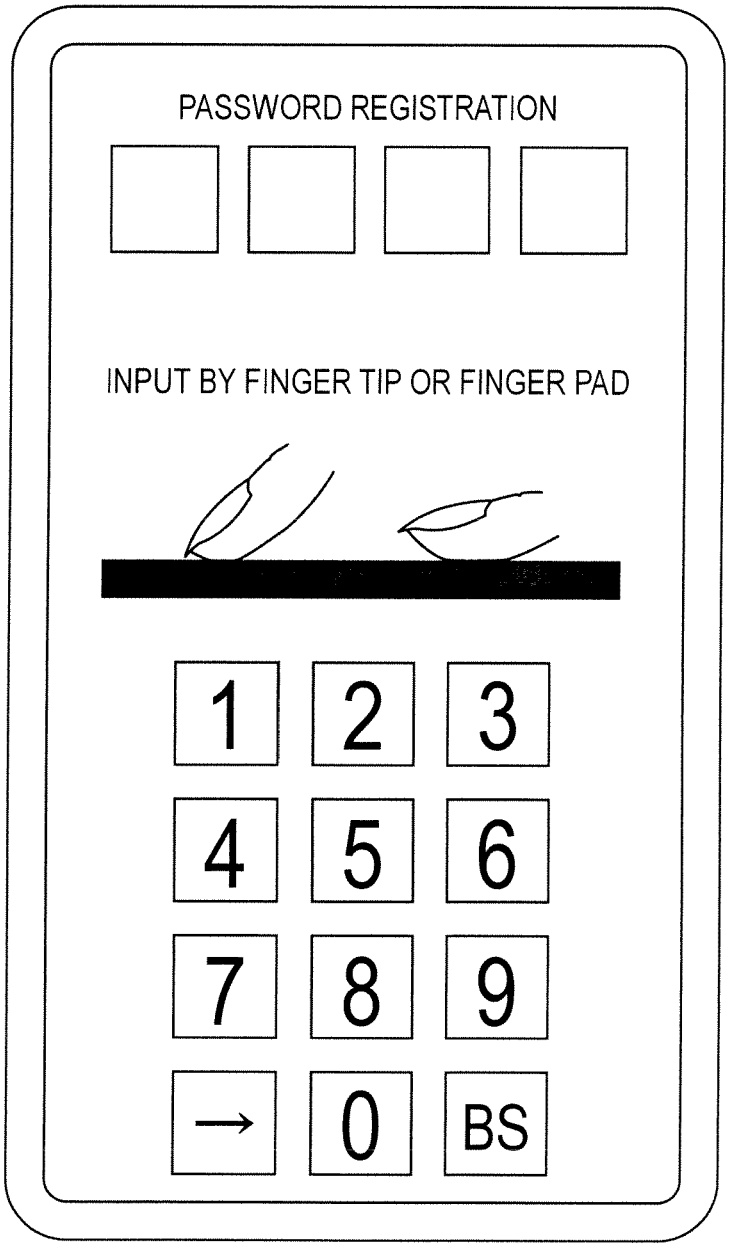
FIG. 11A is an illustration showing a screen that prompts the user to register a password.
Figure 11B:
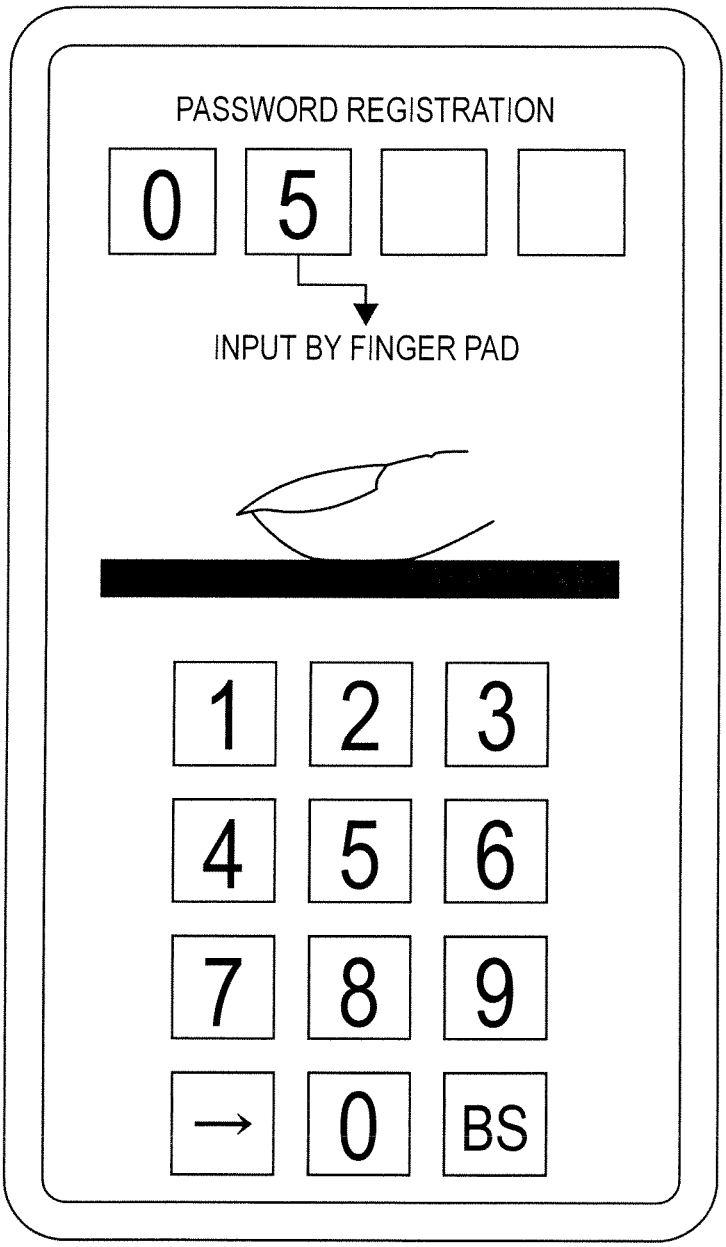
FIG. 11B is an illustration showing a screen displayed during password registration to inform the user that a finger pad input has been made.
Figure 11C:
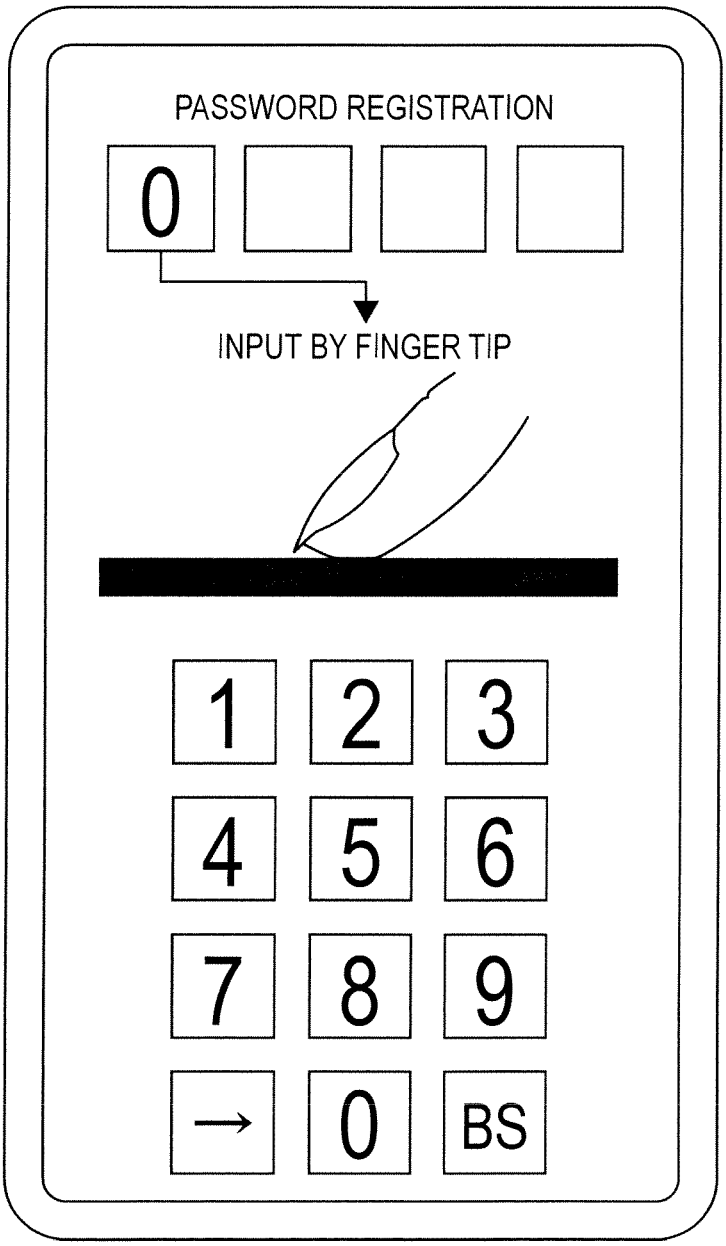
FIG. 11C is an illustration showing a screen displayed during password registration to inform the user that a finger tip input has been made.

A second embodiment of the present invention relates to a portable terminal 0 using a password. The second embodiment is characterized in that it stores not only a numeric password but also a difference in the contact range with the aim of enhancing security. A description is made for an example of the enhanced security function that incorporates a four-digit password and a difference in the contact range with reference to; FIG. 9 showing a flow chart of password registration, FIGS. 10A and 10B showing typical screen images displayed during calibration, FIGS. 11A to 11C showing screen images for prompting a user to register a password, and FIGS. 12A and 12B showing data consisting of a password and a set of corresponding input method. The portable terminal 0 according to the second embodiment has the same configuration as that of the portable terminal 0 according to the first embodiment unless otherwise specified.

The process for password registration will be first described with reference to the flow chart of FIG. 9. After initial settings such as counter reset is done, an image as shown in FIG. 10A is displayed to prompt the user to make a finger tip contact (S2000). A control unit 3 records the contact range of the finger tip input (S2001). Next, an image as shown in FIG. 10B is displayed to prompt the user to make a finger pad contact. The control unit 3 records the contact range of the finger pad input (S2002). Contact ranges are detected at the timing when a button switch 5 is pushed following the contact with finger tip or finger pad. When the contact range of the finger pad input is larger than that of the finger tip input, the control unit 3 authorizes the input as a correct input (S2003: Yes). The contact range of the finger tip input is determined as a threshold value and the value is stored (S2004). When the contact range of the finger pad input is smaller than that of the finger tip input (S2003: No), the control unit 3 prompts the user to make a finger tip input again (S2001). Completing the determination of a threshold value, the control unit 3 next checks the counter value. When the counter is 4 or less (S2005: No), the control unit 3 displays a message to inform the user that a password can be input by either the finger tip input or the finger pad input (FIG. 11A). Registration of the numbers is then authorized.

The user selects and touches any numbers among numbers 0 to 9 displayed on a touch panel 1 by either the finger tip input or the finger pad input. The selected numbers are registered as input numerals (S2006). Then, the control unit 3 compares the contact range with the threshold value. When the contact range is equal to or smaller than the threshold value (S2007: Yes), the control unit 3 stores the input numeral in association with the finger tip input (S2008). A message as shown in FIG. 11C is displayed to inform the user that the numeral has been registered by finger tip input. When the contact range is larger than the threshold value (S2007: No), the control unit 3 stores the input numeral in association with the finger pad input (S2009).

The control unit 3 displays a message as shown in FIG. 11B to inform the user that the numeral has been registered by finger pad input. The control unit 3 then increments the counter and proceeds to the next password input (S2010). When the counter is greater than 4 (S2005: Yes), a numeric string of four input numerals is registered as the password as shown in FIG. 12A. In addition, the input method of either the finger tip input or the finger pad input corresponding to the numeral is stored for each input numeral. The password registration thus terminates (S2011).

Figure 13:
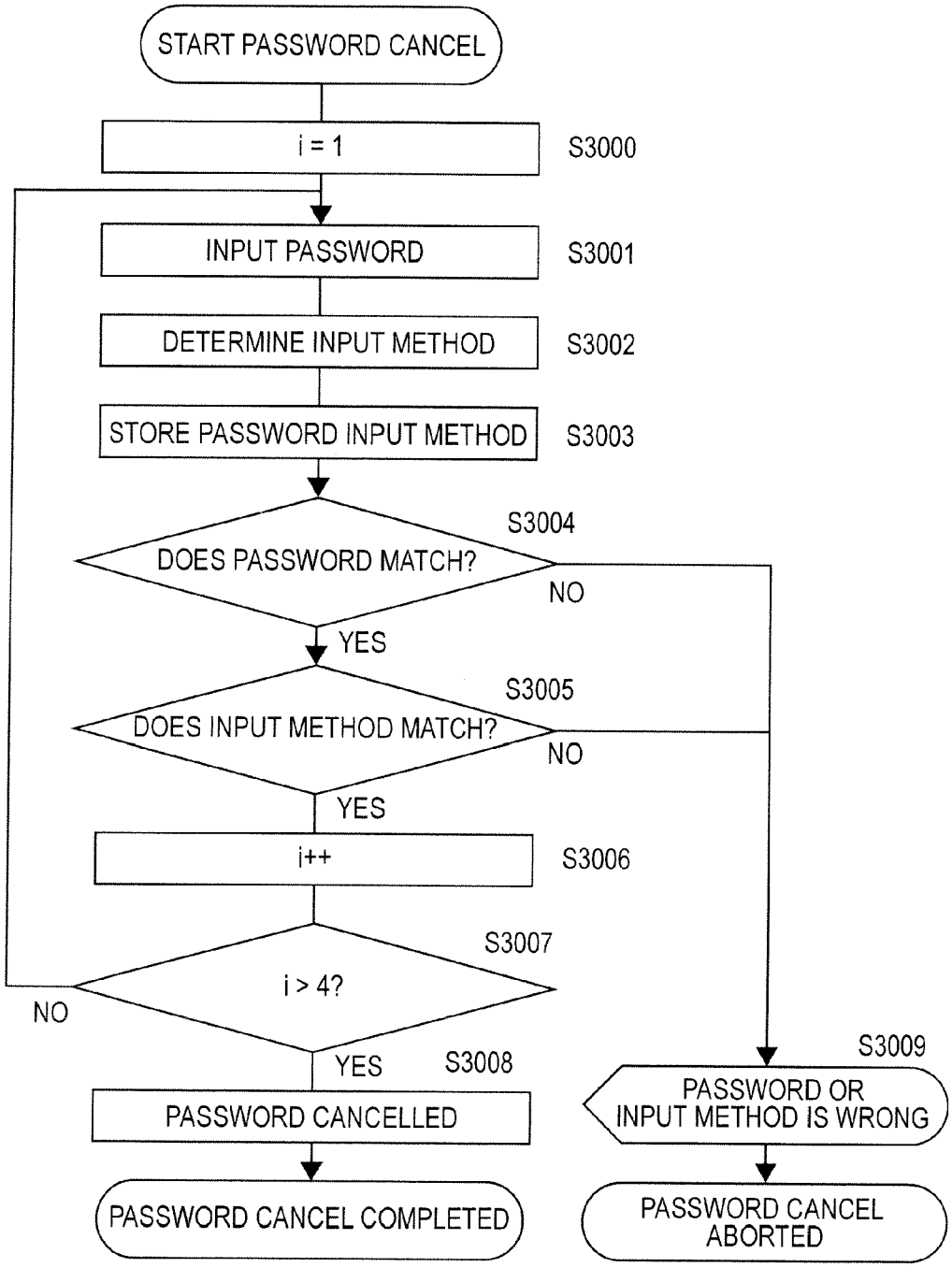
FIG. 13 is a flow chart for password cancellation.
Figure 14:
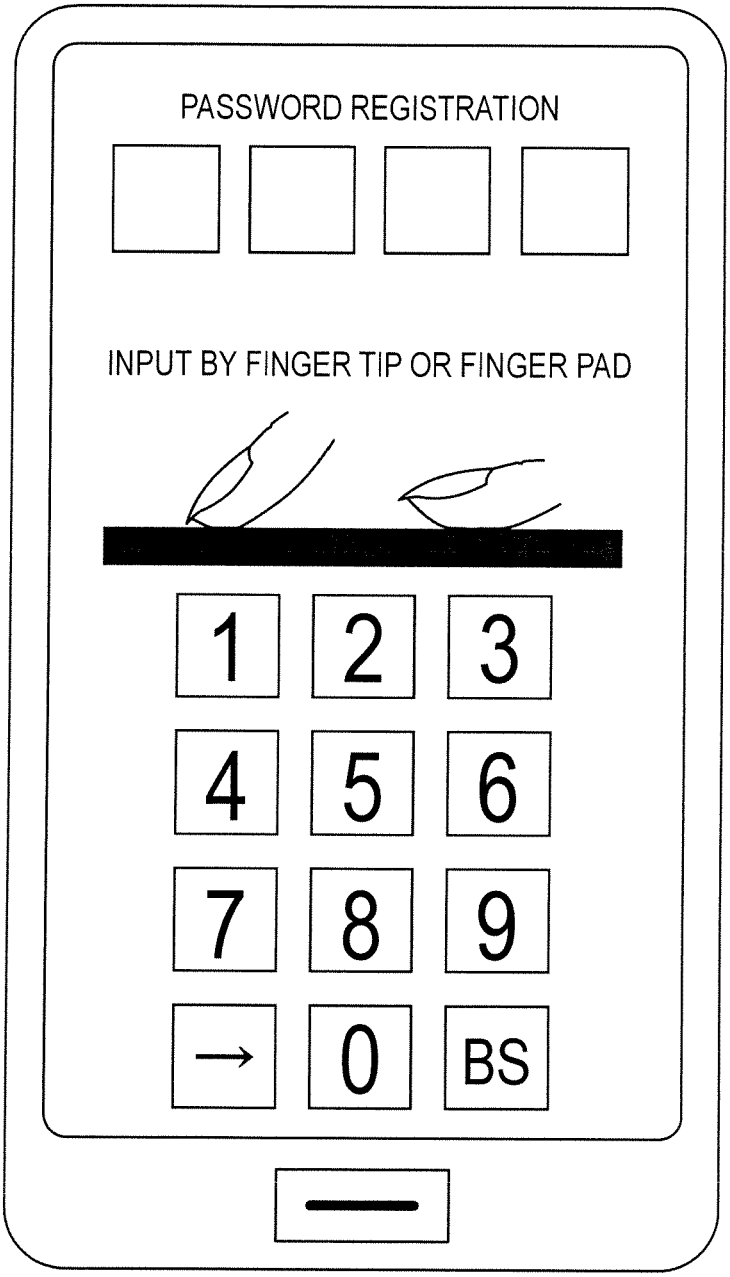
FIG. 14 is an illustration showing a screen that prompts the user to cancel a password.

A method for cancelling or unlocking the password will be next described below with reference to FIG. 13 showing a flow chart of a password cancel process and FIG. 14 showing a password cancel screen.

As can be seen in FIG. 14, the control unit 3 displays a password cancel screen including a ten-key pad with a plurality of numerals in order to prompt the user to input a numeral. At the same time, the control unit 3 performs initial settings such as counter reset (S3000). The control unit 3 waits until a user inputs a numeral (S3001). Upon the user touching the touch panel 1, the control unit 3 specifies the number according to a position of the contact. The contact range of the contact is compared with a threshold value to thereby determine whether the input is a finger tip input or a finger pad input (S3002). The control unit 3 stores the numeral input and the input method used (S3003). When the number of the input and the password registered earlier matches, (S3004: Yes) and the input methods thereof matches as well (S3005: Yes), the control unit 3 increments the counter (S3006). When the counter is not greater than 4 (S3007: No), the control unit 3 proceeds to the step for inputting the next password number. When the counter is greater than 4 (S3007: Yes), the password is authenticated (S3008) and the lock is canceled. Meanwhile, in cases where the number of input and a password do not match (S3004: No), or in cases where the number of input and a password match but their input methods do not match (S3005: No), the control unit 3 displays a message to inform the password or the input method is wrong (S3009). The password cancellation thus terminates.

It is to be noted that a plurality of input methods may be registered for one password. For example, in the case shown in FIG. 12B, three types of input methods are registered for one password and a specific operation is assigned for each of them: input method 1 is for displaying a normal standby screen, input method 2 is for displaying a mail creating screen, and input method 3 is for starting an application. A user can start a desired operation easily by way of unlocking the password, thus contributing to improved convenience. Not to mention, a plurality of input methods may be registered for a plurality of passwords as well.

Using the above system, a user can complicate cancellation of a lock by making a simple input to enhance security. The portable terminal 0 can thus handle user's highly confidential information, which makes the terminal more useful.

Security can be enhanced by only storing, in addition to the password registered, the input method for each of the password numbers. An increase in storage capacity can be sufficiently suppressed.

From the view of a user, the user only needs to remember the input method for each password number to unlock the portable terminal 0. Burdens on the user for memorization can thus be alleviated. It is also advantageous in that when a user has to tell others the way to unlock the portable terminal 0, the user only needs to tell the password numbers and the input method for each of the password numbers.

Although the second embodiment employed a password composed of numerals only, the present invention is not limited to this. The password may be composed of alphabets, symbols, figures, patterns, colors, or other elements, or combinations thereof. In addition, the number of digits of a password is not limited to four and the number may instead be one, two, or a greater numeral.

The process for password registration (FIG. 9) may be started when a predetermined condition is satisfied, such as when the user calls up a particular function from a setting menu.

In the embodiment of the present invention, calibration is performed by a user touching a single point. However, the present invention is not limited to this. For example, the calibration performed during unlocking as described for the first embodiment may be applied. The user may also start calibration by calling up a particular function from the setting menu. Incidentally, during the password cancellation, the message informing the fact that the difference in contact ranges are detected may be not shown (hidden), and when only the numbers are correct, a message may be displayed to inform that the difference in the contact range is also registered. Numerals and input methods may also be hidden and not shown during password input. While a threshold value is used for distinguishing the finger tip input and the finger pad input in the embodiment, the present invention is not limited to this. The determination of an input method may be conducted in a manner such that records both contact ranges of the finger tip input and the finger pad input, and when a input is made, compares the input contact range with the data, whereby selecting the closer one as the method of the particular input.

The operation of distinguishing the difference in the contact range may be omitted in particular situations of input. For example, the system may be adapted so that the classification based on a difference in contact ranges is not performed when the button switch is pressed or when more than two points are touched for multi-touch input.

What is claimed is:

[1. An information processing apparatus comprising:

a touch panel which displaies a plurality of pieces of identification information and detecting a contact of the panel with an object of interest;

a detection unit, when the touch panel detects a contact with the object, which specifies identification information indicated by a position at which the contact in question occurred, of the multiple pieces of identification information displayed on the panel, and which detects an area of part where the contact occurred;

a storage unit which stores reference identification information and a reference area range;

a determination unit which determines whether the identification information detected by the detection unit matches the reference identification information stored in the storage unit and whether the area of the contact detected by the detection unit falls within the reference area range stored in the storage unit; and a control unit which performs particular processing on condition the determination unit determines that the identification information detected by the detection unit matches the reference identification information stored in the storage unit and the area of the contact detected by the detection unit falls within the reference area range stored in the storage unit.]

[2. The information processing apparatus according to claim 1, wherein:

the storage unit stores, when a predetermined condition is satisfied, the identification information and the area of the contact detected by the detection unit as the reference identification information and the reference area range, respectively.]

[3. The information processing apparatus according to claim 1 or 2, wherein:

the storage unit stores first identification information and a first area range and second identification information and a second area range as the reference identification information and the reference area ranges; and the determination unit determines, on condition the identification information detected by the detection unit matches the first identification information stored in the storage unit and the area of the contact detected by the detection unit falls within the first area range stored in the storage unit, whether the identification information detected by the detection unit matches the second identification information stored in the storage unit and the area of the contact detected by the detecting unit falls within the second area range stored in the storing unit.]

[4. The information processing apparatus according to claim 1 or 2, wherein:

the storage unit stores a threshold value; and the reference area range stored in the storage unit is defined based on the threshold value.]

[5. The information processing apparatus according to claim 4, wherein:

the area of the contact detected by the detection unit is registered as the threshold value when a predetermined condition is satisfied.]

[6. An information processing apparatus comprising:

a touch panel which displaies a plurality of pieces of identification information and detecting a contact of the panel with an object of interest;

a detection unit for, when the touch panel detects a contact of the panel with the object, which specifies identification information indicated by a position at which the contact in question occurred, of the multiple pieces of identification information displayed on the touch panel, and which detects an area of part where the contact occurred;

a storage unit whish stores a series of identification information and a series of area ranges, the series of area ranges each corresponding to the respective identification information; and a control unit which performs particular processing on condition that a set of identification information detected by the detection unit matches the series of identification information stored in the storage unit and a series of contact areas detected by the detection unit each falls within the corresponding one of the series of area ranges stored in the storage unit.]

[7. The information processing apparatus according to claim 6, wherein:

the storage unit stores a first set of area ranges and a second set of area ranges as corresponding area ranges of the stored series of identification information; and first processing is performed on condition that a set of identification information detected by the detecting unit matches the series of identification information stored in the storage unit and the areas of the contact detected by the detecting unit each falls within a corresponding one of the first set of area ranges stored in the storage unit, and second processing is performed on condition that a set of identification information detected by the detecting unit matches the series of identification information stored in the storing unit and the areas of the contact detected by the detecting unit each falls within a corresponding one of the second set of area ranges stored in the storage unit.]

*8. An information processing apparatus comprising:*

*a touch panel configured to display a plurality of objects for inputting identification information and detect a contact of the touch panel with a finger of a user;*

*a storage configured to store first information including first reference identification information and a first reference area range,*

*a detector configured to detect second information necessary to identify the user when the touch panel detects a contact with the finger of the user, wherein detecting the second information includes detecting (1) identification information inputted by an object indicated by a position at which the contact in question occurred, of the plurality of objects for inputting identification information displayed on the touch panel, and (2) an area where the contact occurred;*

*a controller configured to control the information processing apparatus to operate at least in an identification mode and a registering mode; and*

*a determination unit which determines in the identification mode that the first information matches the second information when the identification information detected by the detector matches the reference identification information stored in the storage and the area of the contact detected by the detection unit falls within the reference area range stored in the storage,*

*wherein the controller is configured to perform particular processing on condition that the determination unit determines that the first information matches the second information in the identification mode,*

*wherein the registering mode includes a first registering mode for inputting first input information corresponding to a first portion of the finger and a second registering mode for inputting second input information corresponding to a second portion of the finger,*

*wherein the reference identification information is generated and stored in the storage based on both the first*

*input information and the second input information, the first portion corresponding to a pad of the finger*

*wherein the determination unit is configured to determine, in the identification mode, that the first information matches the second information based on the first portion and/or the second portion of the finger,*

*wherein the controller is configured to associate a first numerical password with the first information, and*

*wherein the storage unit is configured to store the first numerical password associated with the first information.*

*9. The information processing apparatus according to claim 8, wherein the reference identification information and the reference area range stored in the storage are based on the identification information and the area of the contact detected by the detector.*

*10. The information processing apparatus according to claim 8,*

*wherein the storage stores a threshold value, and*

*wherein the reference area range stored in the storage is defined based on the threshold value.*

*11. The information processing apparatus according to claim 10, wherein the area of the contact detected by the detector is registered as the threshold value when a predetermined condition is satisfied.*

*12. The information processing apparatus according to claim 8, wherein the first information includes one numeral password as the reference identification information and the reference area range includes a plurality of input methods with the finger for each user.*

*13. The information processing apparatus according to claim 12, wherein said plurality of input methods correspond to displaying a normal standby screen, a mail creating screen and starting an application.*

*14. The information processing apparatus according to claim 8, wherein said controller is configured to unlock the information processing apparatus as the particular processing.*

*15. The information processing apparatus according to claim 14, wherein said controller is furthermore configured to display a mail creating screen.*

* * * * *